United States Patent [19]

Bronoel et al.

[11] Patent Number: 5,244,758
[45] Date of Patent: Sep. 14, 1993

[54] POSITIVE NICKEL ELECTRODE

[75] Inventors: Guy Bronoel, Versailles; Noëlle Tassin, Fontenay-Sous-Bois; Thierry Potier, Neuilly-Sur-Marne, all of France

[73] Assignee: Sorapec S.A., Fontenay-Sous-Bois, France

[21] Appl. No.: 805,939

[22] Filed: Dec. 12, 1991

[30] Foreign Application Priority Data

Dec. 13, 1990 [FR] France .................. 90 15885

[51] Int. Cl.$^5$ .................. H01M 4/32; H01M 4/62
[52] U.S. Cl. .................. 429/223; 429/232; 141/1.1
[58] Field of Search .................. 429/223, 232; 141/1.1

[56] References Cited

U.S. PATENT DOCUMENTS

| | | | |
|---|---|---|---|
| 3,951,686 | 4/1976 | Ness et al. | 429/223 X |
| 4,049,027 | 9/1977 | Seiger | 429/223 X |
| 4,130,696 | 12/1978 | Gunther | 429/232 X |
| 4,217,939 | 8/1980 | Yamagihara et al. | 141/1.1 |
| 4,251,603 | 2/1981 | Matsumoto et al. | 429/94 |
| 4,443,526 | 4/1984 | Jackovitz et al. | 429/223 |

FOREIGN PATENT DOCUMENTS

| | | |
|---|---|---|
| 2738386 | 3/1978 | Fed. Rep. of Germany . |
| 2567326 | 1/1986 | France . |
| 2618949 | 2/1989 | France . |
| 52-36732 | 3/1977 | Japan . |
| 60-146453 | 8/1985 | Japan . |
| 62-51157 | 3/1987 | Japan . |

OTHER PUBLICATIONS

Database WPI, No. 77-31715y, date unknown.
English Abstract of Japanese Application No. 62-51157, date unknown.
English Abstract of Japanese Application No. 60-146453, date unknown.

*Primary Examiner*—Stephen Kalafut
*Attorney, Agent, or Firm*—Sandler Greenblum & Bernstein

[57] ABSTRACT

The positive nickel electrode is provided having a structure of cellular nickel foam filled with a paste based on nickel hydroxide. The paste contains (in dry matter and per 100 parts by weight nickel hydroxide) 7 to 8 parts by weight powder-form nickel metal, 5 to 12 parts by weight of a cobalt hydroxide and/or salt, the parts by weight being expressed as equivalents of cobalt metal.

17 Claims, No Drawings

POSITIVE NICKEL ELECTRODE

This invention relates to a positive nickel electrode, more particularly for an alkaline battery, and to a process for its production.

BACKGROUND OF THE INVENTION

In recent years, positive nickel electrodes intended for alkaline batteries, such as Ni-Cd, Ni-Zn, Ni-Fe, etc., have been developed by two methods.

The first and earlier method comprises packing the active material, namely hydroxide $Ni(OH)_2$, mixed with an additional conductor into a metal container of which the walls are perforated so that the electrolyte is able to impregnate the active material without the active material being able to escape from the container. Although electrodes such as these can be produced at relatively low cost, they are attended by the disadvantage that they have unfavourable weight characteristics (Ah/kg) and are unsuitable for severe charging and discharging conditions.

Progress was also made by development of the process for making electrodes having sintered or fibrous support in which the active material is introduced by chemical or electrochemical precipitation. Electrodes of this type were found to be capable of restoring a significant fraction of their nominal capacity even when they are subjected to discharging rates as rapid as 17 C (discharge in 1/17th of an hour).

However, it must be emphasized that impregnation by chemical precipitation takes a considerable time (several tens of hours). Electrochemical impregnation is advantageous in this regard insofar as it can be carried out in about 1 hour for surface capacities of the order of 40 $mAh/cm^2$.

Over the last decade, numerous efforts have been made to develop a continuous process for introducing the active material into a support by mechanical filling with paste. U.S. Pat. Nos. 4,217,939 and 4,251,603 (Matsushita) and FR-PS 2 618 949 (Sanyo) describe processes for the introduction of a paste based on $Ni(OH)_2$ into three-dimensional structures of the foam type. In addition, it is clear from many publications, particularly those cited above and French Patent No. 2 567 326 (Wonder), that a good yield of active material can only be obtained providing an additionnal conductor, generally Ni powder, is added to the Ni hydroxide.

Japanese patents JP-A-52036732 (Matsushita) and JP-A-6251157 (Shin Kobe Electric Match) describe the use of a paste based on nickel hydroxide and nickel carbonyl or metallic nickel containing cobalt hydroxide.

In the case of Wonder, the $Ni(OH)_2$ powder is accompanied by a conductive powder of nickel carbonyl or graphite. Finally, the advantage of immersing the electrode in cobalt sulfate with regard to the charging efficiency of $Ni(OH)_2$ is also mentioned.

SUMMARY AND DETAILED DESCRIPTION OF THE INVENTION

The present invention is based on the discovery by Applicants that, after several charging and discharging cycles, the cobalt added is in fact converted into cobalt hydroxide $Co(OH)_2$ intimately mixed with $Ni(OH)_2$.

Accordingly, the present invention relates to a positive nickel electrode having a structure of cellular nickel foam filled with a paste based on nickel hydroxide. The paste contains (in dry matter and per 100 parts by weight nickel hydroxide)

7 to 18 parts by weight powder-form nickel metal,
5 to 12 parts by weight of a cobalt salt alone or in admixture with cobalt hydroxide, the parts by weight being expressed as equivalents of cobalt metal.

For reasons of mechanical strength and viscosity of the paste, the paste also advantageously contains 3 to 8 parts by weight polytetrafluoroethylene,
1 to 3 parts by weight methyl cellulose.

Accordingly, determination of the optimal cobalt content represents one aspect of the invention. Another aspect of the invention is a process for incorporating cobalt salt in the paste.

This process is characterized in that the paste is introduced into the cellular nickel foam by mechanical pressing, the cobalt salt alone or in admixture with cobalt hydroxide being in the aqueous phase.

The paste is preferably heated to a temperature of 50° to 80° C. before introduction into the nickel foam for the purpose of stabilization.

The properties of the positive nickel electrode, particularly in regard to its efficiency based on $Ni(OH)_2$ for severe discharging conditions, are essentially determined by the possibilities of draining the electrons towards the collector (the structure of the electrode) at the reaction site. The use of a three-dimensional collector of the foam type is more advantageous in this regard than the use of a collector of the perforated plate type.

However, the use of a foam collector is not sufficient for ensuring correct collection of the charges in the absence of an Ni powder dispersed in $Ni(OH)_2$ which facilitates percolation of the electrons. Since Ni powder is a relatively onerous component, it is advisable to minimize its content in the active material.

According to another aspect of the invention, it has been found that, by using Ni foams of sufficiently small cell diameter, it is possible to minimize the Ni powder content and, at the same time, to obtain performance characteristics for severe discharging conditions. It appears that this performance is better for a minimal content of Ni powder, the smaller the mean cell diameter of the foam.

On the other hand, the smaller the diameter of the cells, the more difficult it is to fill the foam rapidly and completely with the paste.

Accordingly, a compromise and optimum solution has been found whereby the cells of the nickel foam preferably have a mean diameter of 0.1 to 0.4 millimetres, for example 0.2 mm; in other words, the foam contains 100 pores per inch (ppi).

Another compromise and optimum solution has been found in this regard whereby the powder-form nickel metal is advantageously in the form of a powder having a mean diameter of 1 to 5 micrometers.

The cobalt derivative introduced into the paste may be the sulfate, for example in the form of $CoSO_4 \cdot 7H_2O$, or a mixture of this sulfate with the hydroxide $Co(OH)_2$.

The cobalt sulfate is added in the form of an aqueous solution while the cobalt hydroxide, where it is used, is added in the form of a more or less thick aqueous suspension.

The 5 to 12 parts cobalt hydroxide and/or cobalt salt comprise (in equivalents of cobalt metal)

2.5 to 4.5 parts by weight cobalt hydroxide,
2.5 to 7.5 parts by weight sulfate in the form of $CoSO_4 \cdot 7H_2O$.

The following Examples are intended to illustrate the invention without limiting it in any way.

EXAMPLES 1 AND 2

The starting material is a support of Ni foam of the Metapore MN100 (100 ppi) type marketed by EPCI which has a very high porosity with mean cell openings of the order of 0.2 mm. The initial thickness of the Ni foam is selected in dependence upon the required surface capacity, namely:

for 25 mAh/cm$^2$, e$\simeq$1.7 mm (Example 1)
for 46 mAh/cm$^2$, e$\simeq$2.5 mm (Example 2).

A paste having the following composition is prepared in a mixer:

66.8% Ni(OH)$_2$ suitable for electrochemical applications corresponding, for example, to the types marketed by MHO under the name of "Hoboken". This hydroxide contains 3.5% Co in the form of the hydroxide,
8.3% Ni powder having a mean diameter of 3 micrometers
19.9% CoSO$_4 \cdot$7H$_2$O in the form of a 500 g/dm$^3$ solution,
1% methyl cellulose,
4% polytetrafluoroethylene (PTFE) in the form of a 60% aqueous suspension.

In a second phase, the paste obtained is heated in an oven to a temperature of 50° to 80° C. The object of this is to stabilize the paste by fibrillization of the PTFE.

In a third phase, the paste is rehomogenized by kneading, after which 16 g H$_2$O are added per 40 g dry mixture so that the paste is of a suitable consistency for introduction into the foam by pressing and/or immersion, the foam advantageously being filled with the paste from each face.

The electrodes produced in accordance with Example 1 have a surface capacity, as determined at a discharge rate of 0.2 C, of the order of 23 mAh/cm$^2$. At the nominal discharge rate (0.2 C), the efficiency based on Ni(OH)$_2$ is 1. At a discharge rate of 15 C, the restored capacity is 13.8 mAh/cm$^2$ (i.e. 60% of the nominal capacity).

The electrodes produced in accordance with Example 2 have a surface capacity under the same conditions of 46 mAh/cm$^2$.

COMPARISON EXAMPLE 1

The procedure is as described in Example 2 (thickness 2.5 mm) except that the paste containing CoSO$_4 \cdot$7H$_2$O is replaced by a paste containing a Co powder in a quantity of 5% by weight Co based on Ni(OH)$_2$.

The surface capacity obtained, as determined at a discharge rate of 0.2 C, is only 40 mAh/cm, and the efficiency only 0.9.

COMPARISON EXAMPLE 2

The procedure is as in Example 2 (thickness 2.2 mm) using a paste containing Co(OH)$_2$ instead of CoSO$_4 \cdot$7H$_2$O and having the following composition:

81.1% Ni(OH)$_2$ suitable for electrochemical applications,
10.0% Ni powder,
3.9% Co(OH)$_2$,
1% methyl cellulose and
5% polytetrafluoroethylene.

As for Comparison Example the surface capacity obtained, as determined at a discharge rate of 0.2 C, is only 40 mAh/cm$^2$ and the efficiency only 0.9.

What is claimed is:

1. A positive nickel electrode comprising cellular nickel foam filled with a paste, said paste comprising nickel hydroxide, and, in dry matter and per 100 parts by weight nickel hydroxide, 7 to 18 parts by weight powder-form nickel metal, and 5 to 12 parts by weight of a member selected from the group consisting of cobalt salts and a mixture of cobalt salts and cobalt hydroxide, the parts by weight being expressed as equivalents of cobalt metal.

2. The electrode according to claim 1, wherein said paste also contains 3 to 8 parts by weight polytetrafluoroethylene,
    1 to 3 parts by weight methyl cellulose.

3. The electrode according to claim 1, wherein the cellular nickel foam comprises cells having a mean diameter of 0.1 to 0.4 mm.

4. The electrode according to claim 1, wherein said powder-form nickel metal is in the form of a powder having a mean diameter of 1 to 5 micrometers.

5. The electrode according to claim 1, wherein said cobalt salt is cobalt sulfate.

6. The electrode according to claim 1, wherein said 5-12 parts by weight of said member selected from the group consisting of cobalt salts and a mixture of cobalt salts and cobalt hydroxide comprises, in equivalents of cobalt metal, 2.5 to 4.5 parts by weight cobalt hydroxide, and
    2.5 to 7.5 parts by weight sulfate in the form of CoSO$_4 \cdot$7H$_2$O.

7. The electrode according to claim 3, wherein said cells have a mean diameter of about 0.2 mm.

8. The electrode according to claim 1, wherein the paste comprises:

66.8 percent by weight Ni(OH)$_2$ containing 3.5 percent by weight Co in the form of hydroxide,
    8.3 percent by weight Ni powder,
    19.9 percent by weight CoSO$_4 \cdot$7H$_2$O,
    1 percent by weight methyl cellulose, and
    4 percent by weight polytetrafluoroethylene.

9. The electrode according to claim 8, wherein the Ni powder has a mean diameter of 3 micrometers.

10. The electrode according to claim 8, wherein the CoSO$_4$ comprises a 500 g/dm$^3$ solution.

11. The electrode according to claim 8, wherein the polytetrafluoroethylene comprises a 60% aqueous suspension.

12. A process for the production of a positive nickel electrode comprising introducing an aqueous paste into a cellular nickel foam by mechanical pressing, the paste comprising nickel hydroxide, and, in dry matter and per 100 parts by weight nickel hydroxide, 7 to 18 parts by weight powder-form nickel metal, and 5 to 12 parts by weight of a member selected from the group consisting of cobalt salts and a mixture of cobalt salts and cobalt hydroxide, the parts by weight being expressed as equivalents of cobalt metal.

13. The process according to claim 12, wherein the paste is heated to a temperature of 50° to 80° C. prior to introduction into the cellular nickel foam.

14. The process according to claim 13, wherein the paste comprises:

66.8 percent by weight Ni(OH)$_2$ containing 3.5 percent by weight Co in the form of hydroxide, 8.3 percent by weight Ni powder,
19.9 percent by weight $CoSO_4 \cdot 7H_2O$,
1 percent by weight methyl cellulose, and
4 percent by weight polytetrafluoroethylene.

15. The process according to claim 14, wherein the Ni powder has a mean diameter of 3 micrometers.

16. The process according to claim 14, wherein the $CoSO_4$ comprises a 500 $g/dm^3$ solution.

17. The process according to claim 14, wherein the polytetrafluoroethylene comprises a 60% aqueous suspension.

* * * * *